Dec. 15, 1936.  C. R. WATSON  2,064,452
POWER TRANSMITTING MECHANISM
Filed Aug. 30, 1934
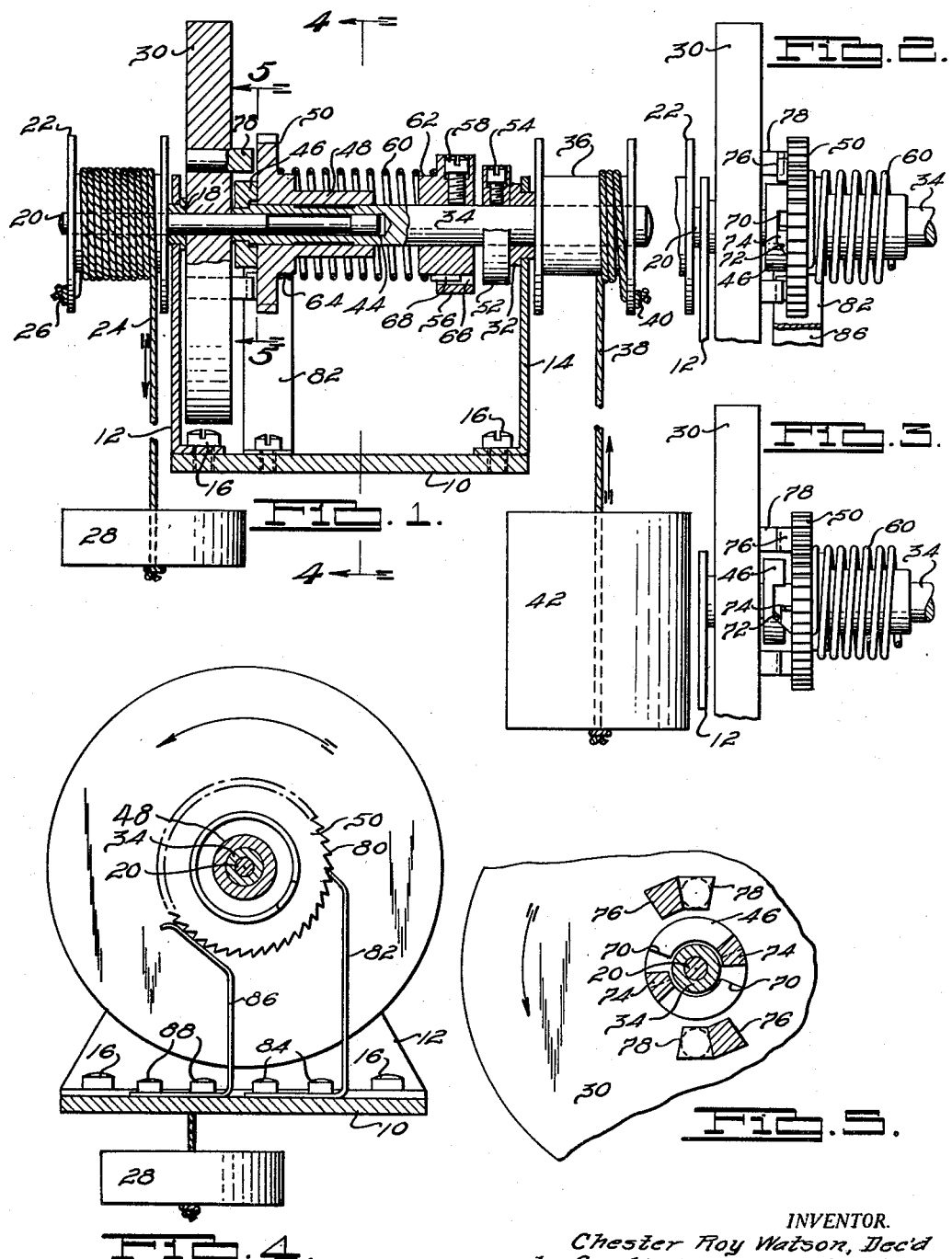
INVENTOR.
Chester Roy Watson, Dec'd
by Cecelia L. Watson, Executrix.
BY
Harness, Dickey, Pierce & Hann
ATTORNEYS.

Patented Dec. 15, 1936

2,064,452

UNITED STATES PATENT OFFICE 2,064,452

POWER TRANSMITTING MECHANISM

Chester Roy Watson, deceased, late of Detroit, Mich., by Cecelia L. Watson, executrix, Detroit, Mich.

Application August 30, 1934, Serial No. 742,058

2 Claims. (Cl. 185—12)

This invention relates to power transmitting mechanism and particularly to a type thereof in which the ratio of reduction in the drive between the driving and the driven member will automatically adjust itself in proportion to the load to be overcome, the principal object being the provision of a device of this type that is simple in construction, efficient in operation and economical to produce.

The invention relates to that general class of devices commonly known as torque converters, which signifies that they embody a speed reduction mechanism between the driving and driven shafts that automatically adjusts itself in response to variations in demand in the driven element to correspond with a constant or predetermined torque input in the driving member. While such mechanisms are applicable to an extremely wide range of uses and may be employed in almost any situation where power is to be transmitted between a driving element and a driven element, perhaps its most obvious use is in connection with motor vehicles where it may be employed to replace the usual change speed transmission disposed between the engine and the driving wheel, and in which position the present invention will act to automatically vary the ratio of driving movement between the engine and the driving wheels to obtain the most advantageous conditions during starting, changes in speed and condition and/or inclination of the surface over which the motor vehicle is passing. Various types of torque converters have heretofore been proposed but as for as is known the present invention is the first to employ the intermittent impulse or impact principle of construction and operation.

Objects of the invention are to provide a torque converter employing the intermittent impulse or impact principle of operation; to provide a torque converter in which energy from the driving member is imparted to an inertia member and is given up by the inertia member to the driven member during such times that the amount of torque required by the driven member exceeds the amount of torque delivered by the driving member in a series of successive impulses; to provide a torque converter in which the torque of the driving member is multiplied in the driven member by storing up energy from the driving member in an inertia member and delivering the stored-up energy to the driven member in a series of impulses each of which is of considerably shorter duration than that required to absorb the energy from the driving member; to provide a construction as above described in which the length of the individual impulses during which time the inertia member transmits its stored-up energy to the driven member varies in proportion to the amount of resistance to be overcome in the driven member; and the provision of a construction as above described in which the power impulses transmitted from the inertia member to the driven member is transmitted through means acting to transmit the force to the driven member in a substantially smooth and even flow.

The above being among the objects of the present invention, the same consists in certain novel features of construction and combinations of parts to be hereinafter described with reference to the accompanying drawing, and then claimed, having the above and other objects in view.

In the accompanying drawing which illustrates an embodiment of the invention in its simplest form, Fig. 1 is a partially broken, partially sectioned side elevational view of a torque converter.

Fig. 2 is a fragmentary side elevational view of the apparatus shown in Fig. 1 and particularly illustrating the relation between the cam surfaces thereof when the device is at rest or is driving at direct speed.

Fig. 3 is a view similar to Fig. 2 but illustrating the positions of the cam surfaces thereof at about the time that the inertia member is to be released from driving engagement with the driven member.

Fig. 4 is a transverse sectional view taken on the line 4—4 of Fig. 1.

Fig. 5 is an enlarged fragmentary sectional view taken on the line 5—5 of Fig. 1.

The embodiment of the invention shown in the accompanying drawing is illustrated in its simplest form and more in the nature of a model to illustrate the principles of construction and operation, the reason for this being that once the principles of construction and operation are disclosed, those skilled in the art will be readily able to adapt it, with such changes as may be required in any particular case, to any desired application. For this reason and in order to better visualize the invention, the embodiment shown in the drawing includes a power input means comprising a weight suspended on a cord wound about a spool or drum secured to the driving shaft and a resistance to be overcome comprising a weight suspended on a cord wound about a spool or drum secured to the driven shaft, the last weight being several times the mass of the first weight to illustrate a condition in which the torque necessary to drive or to accelerate the driven member is several times that exerted by the driving member, thus illustrating a condition equivalent, for instance, to that met with in a motor vehicle when starting up, in climbing a hill or other like conditions.

Referring now to the drawing, a base is illustrated at 10 and shown in the form of a flat plate of rectangular formation. At opposite ends of the base 10 upstanding brackets or supports 12 and 14 respectively are shown and as being fixed to the base 10 by screws 16. The bracket 12 is provided above the base with a bearing bushing 18 for the drive shaft 20 which is rotatably received therein. Fixed to the drive shaft 20 to the left of the bracket 12 as viewed in Fig. 1 is a spool or drum 22 about which a cord 24 is shown wound. One end of the cord 24 is suitably fixed to one rim of the spool 22 as at 26 and the other end of the cord 24 depends from the spool or drum and a weight 28 is suspended therefrom. This weight, acting through the cord and spool, exerts a predetermined torque reaction tending to rotate the drive shaft 20. In the particular instance shown the cord 24 is wound in a right hand direction about the spool 22. Fixed to the drive shaft 20 in any suitable manner on the right hand side of the bracket 12 as viewed in Fig. 1 is a flywheel or inertia member 30 and it will be noted that this cooperates with the spool or drum 22 to maintain the drive shaft 20 against axial displacement.

A bearing bushing 32 is fixed to the upper end of the bracket 14 in axially aligned relation with respect to the bearing bushing 18 and the driven shaft 34 is rotatably received in this bearing bushing. The end of the driven shaft 34 to the right of the bracket 14 has suitably fixed thereto a spool or drum 36 about which a cord 38 is shown partially wound, one end of the cord being fixed to a flange of the spool 36 as at 40 and the opposite end of which suspends a weight 42 which, as will be apparent, is several times the mass of the weight 28 and which, accordingly, will require that a considerably greater torque must be applied to the driven shaft 34 to rotate it than is impressed on the drive shaft 20 by the weight 28. The left hand end of the driven shaft 34 projects into substantially abutting relationship with respect to the flywheel 30 and this end of the driven shaft is centrally apertured as at 44 to receive and form a bearing for the projecting end of the drive shaft 20. In other words, the corresponding ends of the driving and driven shafts 20 and 34 respectively are formed to provide a spigot bearing and the driving and driven shafts are arranged for relative rotation with respect to each other. The left hand end of the driven shaft 34, as viewed in Fig. 1, is shown reduced and has fixed thereto by any suitable means, not shown, a disk-like member 46. Rotatably mounted upon the driven shaft 34 immediately to the right of the member 46 is a sleeve-like or hub-like member 48 having a radially extending disk-like flange 50 at the left hand end thereof. A collar 52 fixed to the driven shaft 34 by means of the set screw 54 in contact with the left hand face of the bearing bushing 32, in conjunction with the spool or drum 36, maintains the driven shaft 34 against axial movement with respect to the bracket 14. Immediately to the left of the collar 52 a shouldered collar 56 is received on the driven shaft 34 and fixed thereto by means of the set screws 58. A coil spring 60 surrounds the driven shaft 34 between the collar 56 and the member 48 and its opposite ends are received on and centered by the shoulders 62 and 64 respectively of these members. The spring 60 serves both as a torsion spring and a compression spring, it being maintained under an initial compressive stress between the members 56 and 48 and its ends are fixed against rotation with the corresponding members 56 and 48. This fixing of the ends of the spring 60 against relative rotation with their corresponding members may be conveniently accomplished in the manner shown in Fig. 1 in connection with the collar 56 by drilling an axially parallel opening 66 in the collar 56 and bending the corresponding end of the spring 60 as at 68 so as to be received in the opening 66.

Referring now to Fig. 2, it will be noted that the right hand face of the member 46 is formed to provide one or more, shown as two by way of illustration, axially opening slots or grooves 70 the end of which most advanced in the normal direction of rotation is beveled as at 72 to form a cam face. The left hand face of the member 48 is provided with a corresponding number of axially projecting lugs 74 adapted to be received in the grooves 70. Each lug 74 is of a smaller circumferential dimension than the slot 70 so as to have circumferential play therein, and one end face thereof is beveled for complementary engagement with the face 72 of the corresponding groove 70.

Outwardly of the lugs 74 from the center of the driven shaft 34 one or more lugs 76 are provided on the left hand end face of the flange 50. At an equal distance radially from the axis of rotation of the shafts 20 and 34 the flywheel 30 is provided with a corresponding number of lugs 78, shown in the form of pins fixed to the flywheel 30, which project beyond the right hand face of the flywheel 30 in intersecting relation with the relative path of travel of the lugs 76.

Means are provided for limiting the rotation of the member 48 to a counter-clockwise direction as viewed in Fig. 4 and, while any suitable or conventional means may be provided for this purpose, the particular means shown for the purpose of illustration is of the ratchet type. For this purpose the periphery of the flange 50 is formed to provide a plurality of ratchet teeth 80. A ratchet arm 82, shown in the form of a strip spring member, is secured to the base 10 by screws 84 and its free end is positioned for operative engagement with the teeth 80 for the purpose described. Likewise, some means are preferably provided for exerting a small amount of drag to the rotation of the member 48 and, while any suitable form of means may be provided for this purpose, the particular means shown by way of illustration comprises a spring arm 86 secured at one end of the base 10 by screws 88 and having the free end thereof resiliently pressed against the periphery of the flange 50 for exerting a braking effect thereon.

From the foregoing it will be apparent that the driving shaft 20 and driven shaft 34 are rotatably supported relative to one another, that the flywheel 30 is fixed to the driving shaft 20 and may be connected to the member 48 through interengagement of the lugs 76 and 78, and that the member 48 is connected to the driven shaft 34 through interengagement of the lugs 74 and grooves 70 in the member 46 and the spring 60 tends to maintain this relation of the parts. In view of the fact that the spools or drums 22 and 36 are of equal diameter and the weight 28 is of considerably less mass than the weight 42, the mechanism provided must be capable of multiplying the torque effective on the driving shaft 20 by reason of the weight 28 if it is to cause the cord 38 to be wound upon the spool or drum 36 and thus lift the weight 42. Incidentally, it might be noted that the superior mass of the weight 42 is prevented from rotating the driven shaft 34 in a reverse direction because of the ratchet mechanism previously described.

The operation of the device is as follows. The weight 28 in tending to rotate the driving shaft 20 causes the flywheel 30 to rotate and bring the lugs 78 into contact with the lugs 76 on the member 48. Thereupon the member 48 tends to rotate with the flywheel 30 and in rotating because of the interengagement of the lugs 74 with the beveled face 72 of the grooves 70 tends to rotate the member 46 and consequently the driven shaft 34 equally therewith. The resistance to turning the shaft 34 sets up a reaction between the beveled faces 72 of the grooves 70 and the cooperating lugs 74 which tends to move the member 48 bodily to the right as viewed in Figs. 1 to 3, inclusive, and if the resistance to turning the shaft 34 is great enough, as in the case shown, the member 48 will thus be forced a sufficient distance to the right to withdraw the lugs 76 axially out of engagement with the lugs 78, upon the occurrence of which the flywheel 30 will be free to continue its rotation freely and regardless of the rotation of the member 48 and driven shaft 34. Immediately, however, after the lugs 78 are thus allowed to pass by the lugs 76 the force of the spring 60 will again return the member 48 to the left and force the lugs 74 into the bottom of the grooves 70 so as to again position the lugs 76 in intersecting relation with respect to the path of travel of the lugs 78 and so that the lugs 78 will again contact the lugs 76 when the flywheel has rotated through a predetermined degree of rotation depending upon the number of interengaging lugs 76 and 78 employed in the particular construction. In this case it is assumed, as indicated in Fig. 5, that there are two diametrically opposite lugs 76 and two diametrically opposite lugs 78 so that once the lugs 76 and 78 are released as above described it will be necessary for the flywheel 30 to rotate through 180 degrees of movement before the lugs 78 are again in position to contact the lugs 76.

During the time interval between which the lugs 78 are freed of the lugs 76 as above described and again are brought into contact with them it will be apparent that the flywheel 30 will rotate unrestrictedly under the force of the weight 28 and thus will absorb a considerable amount of energy in the form of its momentum so that when the lugs 78 again strike the lugs 76 the momentum built up in the flywheel 30 will be transmitted at least in part to the member 48 and will tend to cause it to rotate therewith and will actually cause such rotation until the resistance offered by the shaft 34 to rotation, in the present case necessary to lift the weight 42, acting between the lugs 74 and the beveled faces 72 of the grooves 70, is sufficient to again bodily move the member 48 axially to the left to again disengage the lugs 76 and 78. The rotation which has been imparted to the member 48, however, will be preserved because of the ratchet mechanism previously described and this rotation of the member 48 will have wound up the spring 60 to a greater or lesser extent, thus setting up a force which will act through the collar 56 tending to rotate the shaft 34 regardless of any interengagement between the lugs 76 and 78. As soon as the lugs 76 and 78 are again disengaged the flywheel 30 will again be urged through 180 degrees of rotation during which time it will again store up energy which will again be imparted in part to the member 48 when the lugs 76 and 78 again engage each other and at which time the spring 60 will again be wound up in an attempt to rotate the collar 56 and driven shaft 34. If the driven shaft 34 is stationary when such operations are commenced it will be apparent that eventually sufficient torsion will be set up in the spring 60 to cause the shaft 34 to rotate and in such case during the intervals of time between which the lugs 76 and 78 separate and again come in contact with each other the spring 60 will be continuously effective to continue the rotation of the shaft 34, thus releasing a portion of the torsion built up in the spring and which torsion will be restored in successively short intervals during the time that the lugs 76 and 78 remain in contact with each other.

Thus with this construction, where it is necessary to overcome a greater amount of torque in the driven shaft than is present in the driving shaft, as in the case illustrated, the flywheel 30 is free to rotate unrestrictedly during the greater part of each complete revolution, and operatively engages only momentarily with the member 48 during each complete revolution to give up a portion of the energy stored up while rotating unrestrictedly to wind up the spring 60 and thus store energy in the spring 60 tending to rotate the driven shaft 34.

It will be understood that, because of the fact that the energy directly tending to rotate the driven shaft 34 is built up in the spring 60, there will be a substantially constant and smoothly acting force constantly tending to rotate the driven shaft 34 in spite of the fact that the energy transmitted from the flywheel 30 is transmitted in a series of short and momentarily acting hammer-like blows. It will also be understood that under the particular conditions described in connection with the specific embodiment shown in the drawing, such energy as is stored up in the flywheel 30 during a complete revolution thereof is transferred to the member 48 and then through the spring 60 to the driven shaft 34, but in being transmitted to the member 48 causes it to rotate through only a portion of a complete revolution. It will also be apparent that the amount which the member 48 is rotated during each complete revolution of the flywheel 30 will be dependent upon several factors, any one of which may be varied. For instance, if the axially compressive stress of the spring 60 is increased by adjusting the collar 56 along the axis of the shaft 34 it will tend to hold the lugs 74 more firmly in the notches 70 and thus effect a greater relative amount of rotation of the member 48 with respect to the flywheel 30. On the other hand, the inclination of the cam surface 72 and complementary surface of the lug 74 may be varied to effect a like result and the torsional resistance of the spring 60 may also be varied to effect a similar result. In any case, however, proper construction of the apparatus should be such that with the amount of torque available in the driving shaft 20 the spring 60 will yield sufficiently to permit the lugs 76 and 78 to become momentarily disengaged when starting up from a position of rest of the driven member to permit the successive impact blows between the lugs 76 and 78.

It will be understood that the relative amount of rotation of the member 48 as compared to the rotation of the driving shaft 20 and flywheel 30 will depend upon the amount of resistance offered to rotating the driven shaft 34. In other words, the greater resistance to rotation of the driven shaft 34 the smaller relative amount of rotation of the member 48 with respect to the flywheel 30 will occur and with a smaller amount of resistance to the rotation of the driven shaft 34 the greater will be the amount of relative rotation of the member 48 with respect to the flywheel 30. This fact makes the construction particularly applicable to uses wherein the body to be driven is of a material mass and requires a material amount of power to put it in motion but which, after once being put in motion, requires a smaller amount of power to maintain it in motion. Such a case is that of a motor vehicle which when at rest requires that the torque of the engine be multiplied considerably in order to put the vehicle into motion but once having been put into motion the motion may be maintained with a much smaller ratio of reduction between the engine and the driving wheels. The application of the present invention to such a motor vehicle may be accomplished by inserting it in the drive between the engine and the driving wheels. In such case, considering the engine to be driving the driving shaft 20 and the driven shaft 34 to be connected in the usual manner with the driving wheels of the motor vehicle, upon starting up the successive impacts between the lugs 76 and 78 would be of relatively short duration and so as to impart a relatively small ratio of movement to the member 48 and consequently the driven shaft 34 as compared with the driving shaft 20, this being caused by the large amount of torque necessary to be exerted in the driving wheels in order to place the vehicle in motion. As the vehicle gains in motion, requiring less and less torque to increase or maintain its motion, the degree of rotation of the member 48 as compared with the flywheel 30 would gradually increase until such time that the amount of torque required to maintain the vehicle in motion would be equal to or less than that exerted in the driving shaft 20 at which time the member 48 and the flywheel 30, in other words, the driven and the driving shafts, would rotate equally together. Thus this mechanism, where properly designed to accommodate its use, will provide an automatic and infinitely variable power transmitting mechanism adaptable for use in connection with motor vehicles as well as for any other use.

What is claimed is:

1. A torque converter including in combination a rotatable driving member and a rotatable driven member coaxially disposed, energy storing means mounted on and constantly driven by said driving member, a member resiliently connected to said driven member adapted to cooperate with said energy storing means, and a projection upon said energy storing means for imparting a series of hammerlike blows to said member to effect rotation of said driven member thereby.

2. A torque converter including in combination a rotatable driving member and a rotatable driven member coaxially disposed, energy storing means mounted on and constantly driven by said driving member, a member resiliently connected to said driven member adapted to cooperate with said energy storing means, a projection upon said energy storing means for imparting a series of hammerlike blows to said member to effect rotation of said driven member thereby, and means resiliently urging said member into engagement with said energy storing means.

CECELIA L. WATSON.
*Executrix of the Estate of Chester Roy Watson, Deceased.*